United States Patent [19]
Kemp et al.

[11] Patent Number: 5,904,946
[45] Date of Patent: *May 18, 1999

[54] PROCESS FOR PREPARING REFRIGERATED MEALS

[75] Inventors: Louis E. Kemp, Los Angeles, Calif.; Kevin J. Hopkins, Superior, Wis.

[73] Assignee: Ready Foods International, Inc., Duluth, Minn.

[*] Notice: This patent is subject to a terminal disclaimer.

[21] Appl. No.: 08/904,055

[22] Filed: Jul. 31, 1997

Related U.S. Application Data

[63] Continuation-in-part of application No. 08/807,797, Feb. 28, 1997.

[51] Int. Cl.⁶ ........................................... A23L 3/10
[52] U.S. Cl. ................. 426/412; 426/549; 426/106; 426/302; 426/521; 426/524
[58] Field of Search .................................. 426/412, 442, 426/549, 106, 302, 321, 324, 325, 327, 521, 524, 556

[56] References Cited

U.S. PATENT DOCUMENTS

| | | | |
|---|---|---|---|
| 4,097,612 | 6/1978 | Powrie et al. | 426/269 |
| 4,228,196 | 10/1980 | Weaver et al. | 426/407 |
| 4,505,937 | 3/1985 | Demeulemeester et al. | 426/8 |
| 4,597,976 | 7/1986 | Doster et al. | 426/325 |
| 4,734,291 | 3/1988 | Raffensperger | 426/325 |
| 4,876,104 | 10/1989 | McGuire et al. | 426/57 |
| 4,957,761 | 9/1990 | Hale | 426/410 |
| 5,034,235 | 7/1991 | Dunn et al. | 426/328 |
| 5,229,154 | 7/1993 | Street | 426/392 |
| 5,308,632 | 5/1994 | Howard et al. | 426/412 X |
| 5,312,639 | 5/1994 | Howard et al. | 426/575 |
| 5,332,587 | 7/1994 | Howard et al. | 426/128 |
| 5,447,734 | 9/1995 | Street | 426/268 |
| 5,562,938 | 10/1996 | Lee et al. | 426/412 X |

*Primary Examiner*—Milton Cano
*Attorney, Agent, or Firm*—Kinney & Lange, P.A.

[57] ABSTRACT

A process for preparing a refrigerated prepared meal that includes includes selecting food components from the group consisting essentially of a starch component, a meat component, a vegetable component, a sauce component, and a spice component. The food components are cooked and then mixed to produce a food mixture. The food mixture is packaged in a hermetically sealed container to form a packaged prepared meal. The packaged prepared meal is heated to a temperature of greater than 165° F. The packaged prepared meal is cooled to a temperature of less than about 41° F. The packaged prepared meal produced according to the present invention has a shelf life of at least 90 days when the packaged prepared meal is maintained at a temperature of less than about 41° F.

19 Claims, No Drawings

PROCESS FOR PREPARING REFRIGERATED MEALS

CROSS-REFERENCE TO RELATED APPLICATION(S)

The present application is a continuation-in-part of U.S. patent application No. 08/807,797, which was filed on Feb. 28, 1997.

BACKGROUND OF THE INVENTION

The present invention relates generally to a process for producing prepared foods. More particularly, the present invention relates to a process for preparing refrigerated meals.

Meals that reduce the preparation time prior to consumption are becoming increasingly popular with consumers. While consumers desire the convenience of prepared meals, consumers also desire prepared meals to exhibit taste and appearance characteristics that are similar to homemade meals.

Prepared meals typically contain one or more of the following food components: meat, vegetables, starches, and sauces. For example, consumers expect meat to be tender, vegetables to be crisp, and starches to be firm and flaky and not clumpy.

To maintain the prepared meals with a desired quality until the prepared meals are consumed, prepared meals are typically frozen during the manufacturing process. The prepared meals are then maintained frozen until it is desired to heat the prepared meal for consumption.

Frozen prepared meals are typically thawed and heated using a microwave oven. The frozen prepared meals thereby provide consumers with the ability to quickly prepare meals while minimizing the effort that must be expended to prepare the meals.

In spite of the fact that frozen prepared meals can be stored for extended periods of time without experiencing a decrease in taste and appearance characteristics, frozen prepared meals are typically believed to have inferior taste and appearance characteristics to prepared meals that are distributed and displayed in a refrigerated state.

Various types of pasta and meat prepared meals have been developed to be marketed in a refrigerated state. For example, "fresh" pasta typically exhibits superior taste and appearance characteristics to dried pasta. Similarly, rotisserie-style chicken, which is commonly prepared in a store where the rotisserie-style chicken is sold, has superior taste and appearance characteristics to chicken in frozen prepared meals. Additionally, both "fresh" pasta and rotisserie-style chicken allow consumers to reduce the time needed to prepare the meals when compared to the other listed alternatives.

One common drawback of prior art refrigerated prepared meals is that these prepared meals have a limited shelf life that is considerably less than 90 days. Consumers are reluctant to purchase refrigerated prepared meals where a longer shelf life is obtained through the addition of preservatives to the prepared meals because of potential health risks of consuming large amounts of preservatives over extended time periods.

One way to enhance the shelf life of prepared meals that are distributed and displayed in a refrigerated state is to process the prepared meals to reduce the amount of oxygen within the package. One common way of reducing the oxygen with the package is to purge with an inert gas, such as nitrogen.

BRIEF SUMMARY OF THE INVENTION

The present invention includes a process for preparing a refrigerated prepared meal. The process includes selecting food components from the group consisting essentially of a starch component, a meat component, a vegetable component, a sauce component, and a spice component. The food components are cooked and then mixed to produce a food mixture. The process also includes packaging the cooled food mixture in a hermetically sealed container to form a packaged prepared meal.

The packaged meal is then heated to a temperature of greater than 165° F. Next, the packaged prepared meal is cooled to a temperature of less than about 41° F. The packaged prepared meal has a shelf life of at least 90 days when the packaged prepared meal is maintained at a temperature of less than about 41° F.

DETAILED DESCRIPTION OF THE PREFERRED EMBODIMENTS

A process according to the present invention allows a packaged meal to be prepared so that the packaged meal has a shelf life of at least 90 days when the packaged meal is maintained at a conventional refrigerator temperature of less than about 41° F.

Because the packaged meal of the present invention is maintained in a refrigerated state, the taste and appearance characteristics of the refrigerated packaged meal of the present invention are superior to frozen packaged meals. Additionally, displaying the packaged meal of the present invention in a refrigerated state allows a consumer to obtain a better idea of what the packaged meal looks like than is possible with frozen packaged meals. Because of these benefits of packaged meals prepared according to the present invention, consumers have a greater perceived value of packaged meals made according to the present invention than frozen packaged meals.

A major portion of the prepared meal is preferably a starch component. As used herein, the term "major portion" means greater than about 40 percent of the prepared meal. The starch component used with the present invention is preferably white rice, wild rice, pasta, potato, or combinations thereof.

Examples of types of pasta that are suitable for use with the process of the present invention include elbow, macaroni, wagon wheel, fettuccini, spaghetti, egg noodles, spiral noodles, and angel hair. Examples of types of potatoes that are suitable for use with the process of the present invention include cottage fries, wedges, slim fries, natural skin fries, mashed, diced, and small whole peeled.

As an initial step in preparing the prepared meal of the present invention, the starch component is substantially cooked. A person of ordinary skill in the art will appreciate that there are a variety of ways for cooking the starch component. For example, the starch component may be placed in boiling water.

When rice is used in the starch component, the rice is preferably coated with oil after the cooked rice has cooled to approximately room temperature. The oil is used at a concentration of up to about 5 percent by weight of the cooked rice. Preferably, the oil is added at a concentration of between about 1.5 and 2.5 percent. Mixing the cooked rice and the oil causes the oil to substantially coat the rice. The oil is preferably soybean oil or olive oil. However, other types of oil are also suitable for use with the process of the present invention.

Additional ingredients are mixed with the starch component depending on the desired flavor of the prepared meal. Examples of additional ingredients that are suitable for use with the present invention include meat, vegetables, and sauce. The additional ingredients are preferably a minor portion of the prepared meal. As used herein, the term "minor portion" means less than about 60 percent of the prepared meal.

Examples of meats that are suitable for use with the process of the present invention include beef, pork, chicken, and fish. Prior to mixing with the starch component, the meat is preferably cut into pieces having dimensions of less than about 1 inch and preferably less than about ½ of an inch. Alternatively, the meat can be diced, minced, shaved, cut into strips, or formed into meat balls. The meat is also preferably substantially cooked and then cooled to approximately room temperature before mixing with the starch component.

Vegetables that are particularly suited for use with the prepared meal include beans, bean sprouts, broccoli, cauliflower, cabbage, carrots, celery, corn, onions, peas, water chestnuts, green peppers, red peppers, and yellow peppers. Similar to the meat, the vegetables are preferably cut into pieces having dimensions of less than about 1 inch and preferably less than about ½ of an inch prior to mixing the vegetables with the rice mixture. Alternatively, the vegetables can be cut using other techniques such as dicing and shaving.

Depending on the vegetables selected for use with the present invention and the size into which the vegetables are cut, it is typically not necessary to cook the vegetables prior to incorporating the vegetables into the starch component. Other portions of the process of the present invention are typically sufficient to cook the vegetables to a desired extent so that the vegetables remain crisp and flavorful when consumed.

The prepared meal may also include a sauce component. The sauce component is selected based on the type of prepare meal being produced. For example, when the prepared meal is an Italian-style spaghetti, the sauce component may be a marinara or meat sauce. When the prepared meal is a potato or macaroni side dish, the sauce component may be a cheese sauce, tomato sauce, gravy, white sauce, or sweet and sour type sauce. A person of ordinary skill in the art will appreciate that the sauce component may be prepared in a variety of configurations without departing from the scope of the present invention.

Depending on the type of prepared meal being manufactured, spices, herbs, and other flavorings, which provide the prepared meal with a desired flavor, are added to the starch component. For example, when preparing Spanish rice, saffron is used.

A person of ordinary skill in the art will appreciate that various combinations of the ingredients listed above. A first preferred combination that is particularly suited for use with the method of the present invention includes a starch component, a meat component, a vegetable component, a sauce component, and a spice component. A second preferred combination includes pasta, a vegetable component, a sauce component, and a spice component. The first and second preferred combinations are preferably used as the main course of a meal. A third preferred combination includes rice, a vegetable component, a sauce component, and a spice component. A fourth preferred combination includes potato, a vegetable component, a sauce component, and a spice component. The second, third, and fourth preferred combinations are preferably used as side dishes that accompany a meal. As such, the second, third, and fourth preferred combinations have serving sizes that are smaller than the first preferred combination.

After all of the ingredients are mixed into the food mixture, the food mixture is placed into a plastic bag or tray. The plastic bag or tray is then hermetically sealed. The plastic bag or tray used in conjunction with the present invention preferably has a multiple layer construction to prevent flavors from the food mixture from leaching through the plastic bag or tray. The plastic bag or tray also prevents chemicals from passing through the plastic bag or tray and into the food mixture.

Trays are preferably fabricated from of high density polyethylene with lidding which is made from polyethylene with weave or other acceptable material. Tray and lidding allow microscopic amounts of oxygen to penetrate to package. Tops are preferably clear or with printing and may also have cardboard type sleeve placed thereover for conveying information about the prepared meal. The tray may be clear, opaque or colored.

To enhance the ability to work with the plastic bag or tray, the plastic is selected so that the plastic bag or tray may be hermetically sealed using conventional heat sealing equipment. Additionally, the plastic bag or tray is selected to withstand temperatures of between about 0° F. and 211° F. without experiencing a decrease in structural integrity. One preferred plastic used is fabricating the plastic bag or tray is polyethylene.

Each plastic bag or tray is preferably selected with a size that approximately corresponds with a size of the prepared meal that is to be packaged. For example, when the prepared meal is desired to be a side dish, the prepared meal typically is selected with a weight of between about 5 and 32 ounces. When the prepared meal is desired to be a main course, the prepared meal is selected with a weight of between about 8 and 32 ounces.

To further enhance the appeal of the prepared meal of the present invention, the plastic bag or tray preferably has clear portions that allow consumers to view the packaged prepared meal while the packaged prepared meal is displayed prior to purchase. Other portions of the plastic bag or tray may be imprinted with a name of the distributor, a trademark under which the prepared meal is marketed, preparation instructions, and a list of ingredients in the prepared meal. These other portions of the plastic bag or tray may be clear, opaque, colored, or a combination thereof.

The packaged prepared meal is then heated to a temperature of at least 165° F. Once the prepared meal attains a core temperature of at least 165° F., the packaged prepared meal is maintained at the temperature for a period of at least 30 minutes depending on the size and shape of the packaged meal. Preferably, the packaged prepared meal is maintained at a temperature of at least 165° F. for about 30 minutes. Heating for this duration kills bacteria present in the packaged prepared meal. Preferably, the packaged prepared meal is maintained at a temperature of 176° F. for about 30 minutes.

To ensure even and thorough heating of the packaged prepared meal, heating is preferably accomplished by placing the packaged prepared meal in a hot water bath having a desired temperature. A person of ordinary skill in the art will appreciate that there are alternative ways for heating the packaged prepared meal.

An advantage of using the hot water bath is that the hot water bath allows the packaged prepared meal to be rapidly heated to the desired temperature. Rapidly heating the packaged prepared meal minimizes the production of off-flavors in the prepared meal.

The packaged prepared meal is then cooled to a temperature of less than about 41° F. Preferably, the packaged prepared meal is maintained at a temperature of between about 32° F. and 41° F., which is similar to temperatures typically found in a refrigerator. Cooling the packaged prepared meal is preferably accomplished by placing the packaged prepared meal in a cool water bath.

The packaged prepared meal is maintained at a temperature of less than about 41° F. during distribution and display prior to consumption. The process of the present invention enables the packaged prepared meal to be maintained under these refrigerated conditions for at least 90 days without the packaged prepared meal experiencing a decrease in quality, such as the taste or appearance of the prepared meal.

When it is desired to consume the packaged prepared meal, at least one small slit is made in the plastic bag or tray of the packaged prepared meal. The packaged prepared meal is then heated preferably using a microwave oven. For most combinations of the starch component, the meat component, the vegetable component, the sauce component, and the spice component used in preparing the packaged prepared meal, heating the packaged prepared meal in a microwave oven for between about 2 and 2.5 minutes is sufficient for packaged prepared meal to attain a desired temperature for consumption.

The plastic bag or tray is then cut open and the heated prepared meal is removed from the plastic bag or tray and placed onto a serving dish, microwave tray or consumed from package. The starch component is firm and flaky and not dry or clumpy. Additionally, the meat component is tendered and the vegetable component is crisp.

The method of the present invention is described in the following examples. These examples are provided as an illustration of the invention and are not intended to limit the invention.

EXAMPLES

EXAMPLE 1

The characteristics of the process of the present invention were studied by preparing a black bean chili with rice prepared meal. The food components were selected having the weight percent concentrations set forth in Table 1.

TABLE 1

| Ingredient | Concentration |
| --- | --- |
| White rice | 40.0 |
| Black beans | 17.6 |
| Diced tomatoes in puree | 19.0 |
| Kernel corn | 4.9 |
| Diced onion | 4.9 |
| Chili peppers | 4.9 |
| Jalapeno peppers | 3.6 |
| Spices | 4.2 |
| Salt | 0.7 |

Next, the white rice, the black beans, and the kernel corn were cooked. Each of the food components were then mixed together to form a food mixture. Next, the food mixture was hermetically sealed in a polyethylene pouch.

The packaged meal was placed in boiling water for approximately 30 minutes. The packaged meal was then cooled to a temperature of less than 41° F. by submersing the packaged meal in a cool water bath.

The prepared meal was then maintained at a conventional refrigerator temperature of between about 32° F. and 41° F. for a period of 90 days. At selected intervals during the hold period, the taste and appearance characteristics of the prepared meal were examined. It was found that the taste and appearance of the prepared meal did not experience a decrease over the 90 day period.

EXAMPLE 2

The process set forth in Example I was used to prepare a fettuccini alfredo prepared meal. The food components used in making this meal were selected using the percentages set forth in Table 2.

TABLE 2

| Ingredient | Concentration |
| --- | --- |
| Fettuccini noodles | 71.6 |
| Parmesan cheese sauce | 6.3 |
| Romano cheese sauce | 4.9 |
| Non-fat dry milk | 4.9 |
| Corn Starch | 3.6 |
| Water | 3.6 |
| Butter | 1.8 |
| Whey powder | 1.3 |
| Spices | 0.5 |

The prepared meal was packaged, heated, and then cooled using the process set forth in Example 1. The prepared meal was then maintained at a temperature of between about 32° F. and 41° F. for a period of 90 days. At selected intervals during the hold period, the taste and appearance characteristics of the prepared meal were examined. It was found that the taste and appearance of the prepared meal did not experience a decrease over the 90 day period.

EXAMPLE 3

The process set forth in Example 1 was used to prepare a roasted garlic mashed potatoes prepared meal. The food components used in making this meal were selected using the percentages set forth in Table 3.

TABLE 3

| Ingredient | Concentration |
| --- | --- |
| Instant potato flakes | 77.6 |
| Water | 14.1 |
| Non-fat dry milk | 4.2 |
| Minced garlic | 3.6 |
| Diced onion | 0.2 |
| Butter | 0.1 |
| Salt | 0.1 |
| Spices | 0.2 |

The prepared meal was packaged, heated, and then cooled using the process set forth in Example 1. The prepared meal was then maintained at a temperature of between about 32° F. and 41° F. for a period of 90 days. At selected intervals during the hold period, the taste and appearance characteristics of the prepared meal were examined. It was found that the taste and appearance of the prepared meal did not experience a decrease over the 90 day period.

Although the present invention has been described with reference to preferred embodiments, workers skilled in the art will recognize that changes may be made in form and detail without departing from the spirit and scope of the invention.

We claim:

1. A process for preparing a refrigerated prepared meal, the process comprising the steps of:
   selecting food components from the group consisting of a starch component, a meat component, a vegetable component, a sauce component, and a spice component;
   cooking at least the starch and meat components;
   mixing the cooked components with the rest of the food components to produce a food mixture;
   packaging the food mixture in a hermetically sealed container to form a packaged meal;
   heating the food mixture in the sealed container to a temperature greater than 165° F.; and
   cooling the packaged meal to a temperature of less than 41° F. but above about 32° F., wherein the packaged meal has a shelf life of at least 90 days when maintained at a temperature of less than about 41° F. but above about 32° F.

2. The process of claim 1, wherein the starch component includes white rice, wild rice, pasta, potatoes, or combinations thereof.

3. The process of claim 1, and further comprising mixing oil with the starch component at a concentration of between about 1.5 and 2.5 percent by weight of the starch component.

4. The process of claim 3, wherein the oil includes soybean oil, olive oil, or combinations thereof.

5. The process of claim 1, wherein the meat component comprises beef, pork, chicken, fish, or combinations thereof.

6. The process of claim 5, wherein the vegetable component comprises beans, broccoli, cauliflower, cabbage, carrots, celery, corn, onions, peas, water chestnuts, green peppers, red peppers, yellow peppers, or combinations thereof.

7. The process of claim 1, wherein the packaged meal is maintained at a core temperature of between about 175° F. and 180° F. for about 30 minutes.

8. The process of claim 7, wherein the packaged meal is heated by placing the packaged meal in a hot water bath.

9. The process of claim 1, wherein the packaged meal is cooled to a temperature of between about 32° F. and 41° F.

10. The process of claim 9, wherein the packaged meal is cooled by placing the packaged meal in a cool water bath.

11. The process of claim 1, and further comprising heating the packaged meal to a consumption temperature.

12. The process of claim 11, wherein the packaged meal is heated in a microwave oven for between about 2 minutes and 2.5 minutes.

13. A process for preparing a refrigerated prepared meal, the process comprising the steps of:
   selecting food components from the group consisting of a starch component, a meat component, a vegetable component, a sauce component, and a spice component;
   cooking at least the starch and meat components;
   mixing the cooked components with the rest of the food components to produce a food mixture;
   packaging the food mixture in a hermetically sealed container to form a packaged prepared meal;
   heating the packaged prepared meal to a temperature of between about 170° F. and 180° F. for about 30 minutes; and
   cooling the packaged prepared meal to a temperature of between 32° F. and 41° F. wherein the packaged prepared meal has a shelf life of at least 90 days when maintained at a temperature of between 32° F. and 41° F.

14. The process of claim 13, wherein the starch component includes white rice, wild rice, pasta, potatoes, or combinations thereof.

15. The process of claim 13, wherein oil is mixed with the rice at a concentration of between about 1.5 and 2.5 percent by weight of the rice.

16. The process of claim 13, wherein the meat component comprises beef, pork, chicken, fish, or combinations thereof.

17. The process of claim 13, wherein vegetable components comprises beans, broccoli, cauliflower, cabbage, carrots, celery, corn, onions, peas, water chestnuts, green peppers, red peppers, yellow peppers, or combinations thereof.

18. The process of claim 13, and further comprising heating the packaged prepared meal to a consumption temperature.

19. The process of claim 18, wherein the packaged prepared meal is heated in a microwave oven for between about 1.5 minutes and 2 minutes.

* * * * *